US012762206B2

(12) United States Patent
Hummelshøj

(10) Patent No.: US 12,762,206 B2
(45) Date of Patent: Oct. 13, 2026

(54) MULTITASK LEARNING BASED ON HERMITIAN OPERATORS

(71) Applicant: TOYOTA RESEARCH INSTITUTE, INC., Los Altos, CA (US)

(72) Inventor: Jens Strabo Hummelshøj, Brisbane, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 857 days.

(21) Appl. No.: 17/884,170

(22) Filed: Aug. 9, 2022

(65) Prior Publication Data

US 2024/0054184 A1 Feb. 15, 2024

(51) Int. Cl.

| | |
|---|---|
| ***G06N 20/00*** | (2019.01) |
| ***G06F 18/214*** | (2023.01) |
| ***G06F 18/2415*** | (2023.01) |

(52) U.S. Cl.

CPC ........ *G06F 18/214* (2023.01); *G06F 18/2415* (2023.01); *G06N 20/00* (2019.01)

(58) Field of Classification Search

None

See application file for complete search history.

(56) References Cited

U.S. PATENT DOCUMENTS

| | | | | |
|---|---|---|---|---|
| 2019/0011621 | A1* | 1/2019 | Karafin | G06F 3/011 |
| 2019/0286791 | A1* | 9/2019 | Takeda | G16C 20/30 |
| 2020/0272702 | A1* | 8/2020 | Takeda | G06N 3/09 |
| 2021/0133635 | A1* | 5/2021 | Hagawa | G06N 3/08 |
| 2022/0076076 | A1* | 3/2022 | Morgan | G06N 20/10 |
| 2022/0128611 | A1* | 4/2022 | Almog | G01S 3/14 |
| 2023/0193720 | A1* | 6/2023 | Amini | G16C 20/30<br>166/285 |

OTHER PUBLICATIONS

Li et al. (Li) "Deep-learning density functional theory Hamiltonian for efficient ab initio electronic-structure calculation" Published Jun. 23, 2022 at Nature Computational Science2, 367-377 (2022) https://doi.org/10.1038/s43588-022-00265-6 (Year: 2022).*

* cited by examiner

*Primary Examiner* — Xuyang Xia
(74) *Attorney, Agent, or Firm* — SEYFARTH SHAW LLP

(57) ABSTRACT

A method for multitask learning based on Hermitian operators is described. The method includes training a multitask machine learning (MTML) model to map an input representation of a material onto a complex wave function state vector. The method also includes inferring, by a trained, MTML model, observable property matrices for each observable property of the material. The method further includes converting the observable property matrices into complex Hermitian operators. The method also includes predicting target properties of the material according to the complex Hermitian operators and the complex wave function state vector.

10 Claims, 7 Drawing Sheets

MULTITASK LEARNING BASED ON HERMITIAN OPERATORS

TECHNICAL FIELD

Certain aspects of the present disclosure generally relate to artificial neural networks and, more particularly, to multitask learning based on Hermitian operators.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

Machine learning may be used to perform both materials discovery and predict properties of the materials faster than molecular simulations. Machine learning can help identify correlations between material features and target properties. Nevertheless, most material discovery and properties are determined by single task machine learning models. With regards to multitask machine learning for material discovery/properties, there are significant difficulties with training a multitask model, such as task interference training.

SUMMARY

A method for multitask learning based on Hermitian operators is described. The method includes training a multitask machine learning (MTML) model to map an input representation of a material onto a complex wave function state vector. The method also includes inferring, by a trained, MTML model, observable property matrices for each observable property of the material. The method further includes converting the observable property matrices into complex Hermitian operators. The method also includes predicting target properties of the material according to the complex Hermitian operators and the complex wave function state vector.

A non-transitory computer-readable medium having program code recorded thereon for multitask learning based on Hermitian operators is described. The program code is executed by a processor. The non-transitory computer-readable medium includes program code to train a multitask machine learning (MTML) model to map an input representation of a material onto a complex wave function state vector. The non-transitory computer-readable medium also includes program code to infer, by a trained, MTML model, observable property matrices for each observable property of the material. The non-transitory computer-readable medium further includes converting the observable property matrices into complex Hermitian operators. The non-transitory computer-readable medium also includes predicting target properties of the material according to the complex Hermitian operators and the complex wave function state vector.

A system for multitask learning based on Hermitian operators is described. The system includes a multitask machine learning (MTML) model, trained to map an input representation of a material onto a complex wave function state vector. The trained MTML model to infer observable property matrices for each observable property of the material. The trained MTML model is further to convert the observable property matrices into complex Hermitian operators. The trained MTML model is further to predict target properties of the material according to the complex Hermitian operators and the complex wave function state vector.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
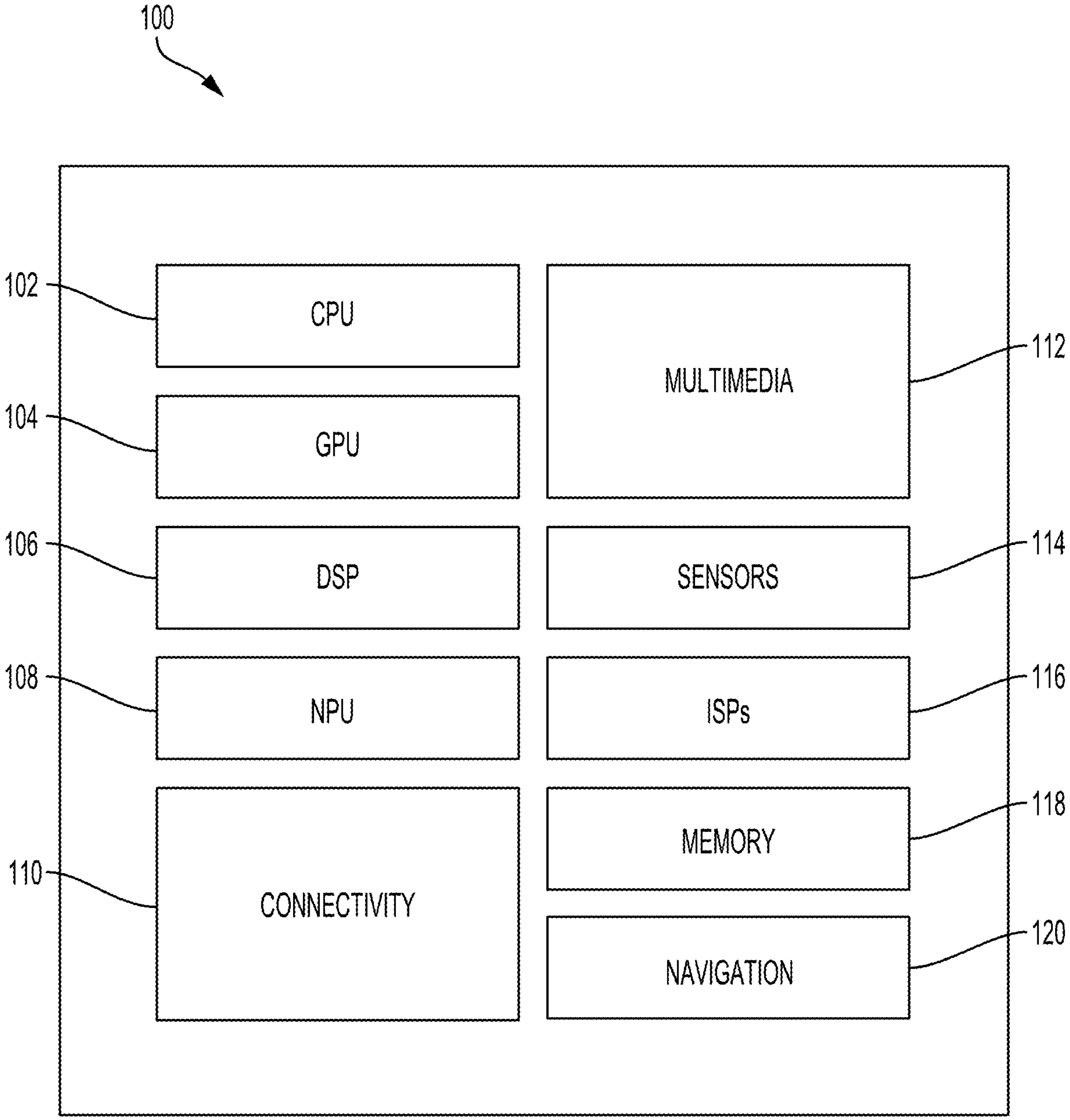
FIG. 1 illustrates an example implementation of designing a neural network using a system-on-chip (SoC), including a general purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

Machine learning is concerned with the automatic discovery of patterns in data through the use of computer algorithms. Once discovered, these patterns may be used to perform data classification and/or value prediction. With growing experimental and simulated dataset size for materials science research, the ability of algorithms to automatically learn and improve from data becomes increasingly useful. Various types of machine learning algorithms, such as neural networks, have recently been applied to materials research. Among these machine learning algorithms, convolutional neural networks (CNNs) have been very attractive in recent years due to their great success in image recognition.

A CNN may be composed of multilayer neural networks, of which at least one layer employs a mathematical operation called "convolution" to enable the CNN to extract high-level features directly from data. Compared to many other algorithms that specify artificial features based on domain knowledge, a CNN involves relatively little preprocessing, as the features can be directly learned from the data. This is particularly useful when the features are difficult to exactly define. Unlike their long-used basic forms, such as perceptron and fully connected neural networks, CNNs are very recently used for solving solid state problems, such as learning material property prediction, material classification, and material phase transition identification.

Another advantage of neural networks is that they are easy to utilize in transfer learning, which means that a neural network first learns from a large database with inexpensive labels (e.g., first principles calculation results), and then it is fine-tuned on a small dataset where much fewer labeled samples are available (e.g., experimental data). This technique can be used to overcome the data scarcity problem in materials research, and it is applied to property prediction of small molecules and crystalline compounds very recently as a tool for accelerated materials discovery.

The practical realization and sustainable future of emergent technologies is dependent on accelerating materials discovery. Data-driven methods are anticipated to play an increasingly significant role in enabling this desired acceleration. While the vision of accelerating materials discovery using data-driven methods is well-founded, practical realization is throttled due to challenges in data generation, ingestion, and materials state-aware machine learning. High-throughput experiments and automated computational workflows are addressing the challenge of data generation, and capitalizing on these emerging data resources involves ingestion of data into an architecture that captures the complex provenance of experiments and simulations.

In practice, machine learning may be used to perform both materials discovery and predict properties of the materials faster than molecular simulations. Machine learning can help identify correlations between material features and target properties. Nevertheless, most material discovery and properties are determined by single task machine learning models. At a top level, a multitask model can receive some information regarding a material, such as a formula or a material structure. In this example, the multitask model can output one or more predicted properties of the material, such as bandgap, a lattice constant, an elastic property, a formation energy, and the like. Unfortunately, multitask machine learning for material discovery/properties suffers from significant difficulties during training of the multitask model, such as task interference.

Some aspects of the present disclosure provide an improvement over current machine learning technology by enforcing a mathematical structure to machine learning of multiple properties of a material using a multitask model. In particular, some aspects of the present disclosure are directed to training of a multitask model by applying physical observables and quantum mechanics theory to enforce a mathematical structure on machine learning of multiple properties of materials. As a result, during training the model infers both the mapping of the input vectors to complex numbered state vectors and a set of complex Hermitian matrices (e.g., operators) for each observable that may or may not be input dependent. The target properties are calculated as expectation values of the respective operators of the Hermitian matrices given the state vectors.

FIG. 1 illustrates an example implementation of a system-on-chip (SoC) 100, which may include a central processing unit (CPU) 102 or multi-core CPUs, in accordance with certain aspects of the present disclosure, such an artificial intelligence (AI) material state prediction. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
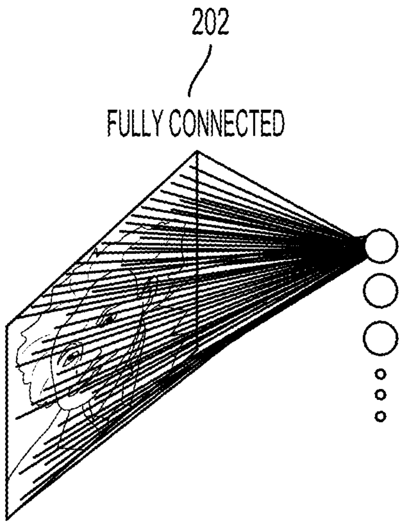
FIGS. 2A, 2B, and 2C are diagrams illustrating a neural network, in accordance with aspects of the present disclosure.
Figure 2B:
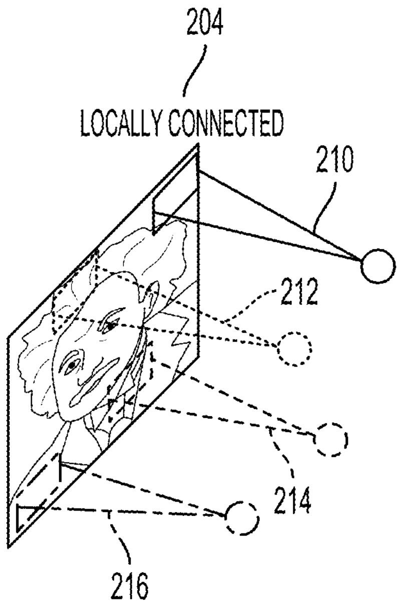
Figure 2C:
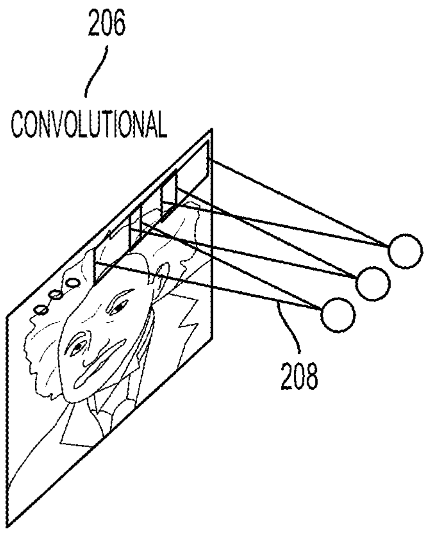

FIGS. 2A, 2B, and 2C are diagrams illustrating a neural network, in accordance with aspects of the present disclosure. The connections between layers of the neural network shown in FIG. 2A-2C may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer.

FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

FIG. 2C illustrates an example of a locally connected neural network is a convolutional neural network. As shown in FIG. 2C, an example of a locally connected neural network is provided as a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
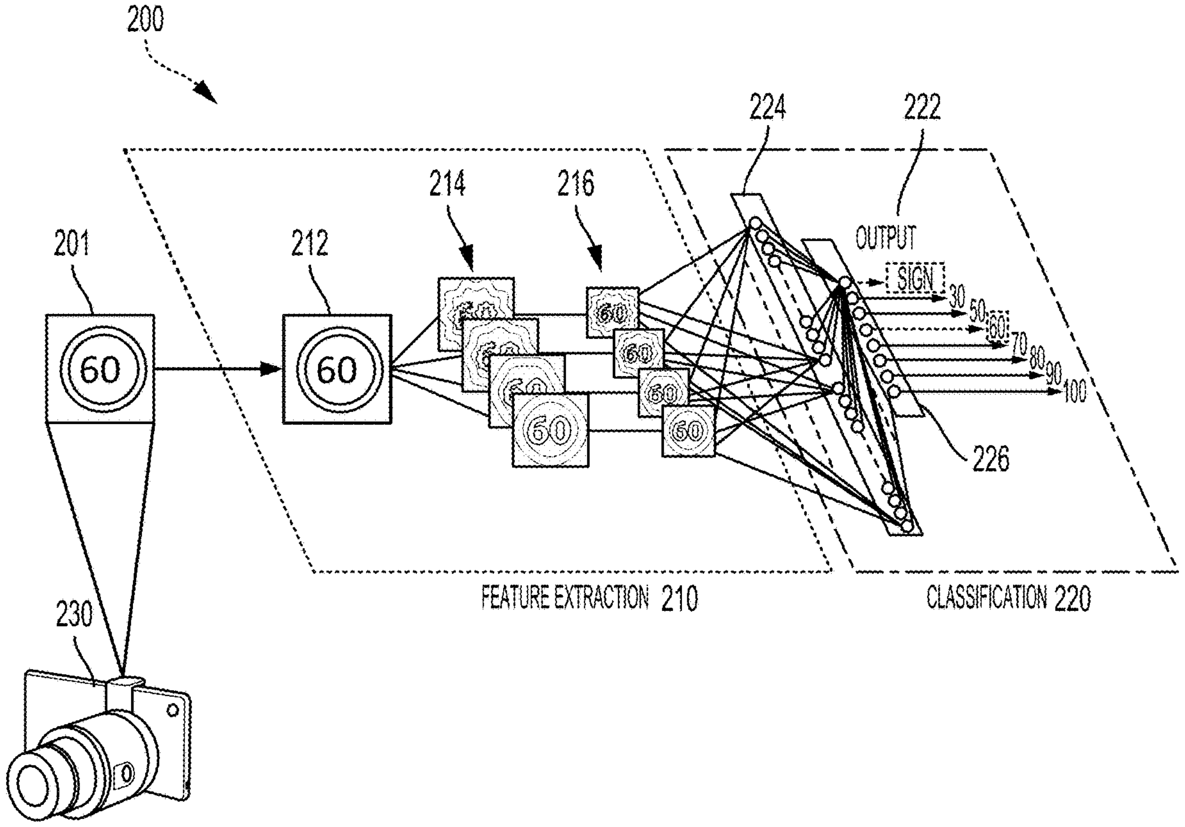
FIG. 2D is a diagram illustrating a neural network, in accordance with aspects of the present disclosure.

FIG. 2D illustrates one type of convolutional neural network, referred to as a deep convolutional network (DCN). In particular, FIG. 2D illustrates a detailed example of a DCN 200 designed to recognize visual features from an image 201, which is provided as an input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights, or predicting states of material sample following processing.

The DCN 200 may be trained with supervised learning. During training, the DCN 200 may be presented with an image, such as the image 201 of a speed limit sign, and a forward pass may then be computed to produce an output 222. The DCN 200 may include a feature extraction section 210 and a classification section 220. Upon receiving the image 201, a convolutional layer 212 may apply convolutional kernels (not shown) to the image 201 to generate a first set of feature maps 214. As an example, the convolutional kernel for the convolutional layer 212 may be a 5×5 kernel that generates 28×28 feature maps. In the present example, because four different convolutional kernels were applied to the image 201 at the convolutional layer 212, four different feature maps are generated in the first set of feature maps 214. The convolutional kernels may also be referred to as filters or convolutional filters.

The first set of feature maps 214 may be subsampled by a max pooling layer (not shown) to generate a second set of feature maps 216. The max pooling layer reduces the size of the first set of feature maps 214. That is, a size of the second set of feature maps 216, such as 14×14, is less than the size of the first set of feature maps 214, such as 28×28. The reduced size provides similar information to a subsequent layer while reducing memory consumption. The second set of feature maps 216 may be further convolved via one or more subsequent convolutional layers (not shown) to generate one or more subsequent sets of feature maps (not shown).

In the example of FIG. 2D, the second set of feature maps 216 is convolved to generate a first feature vector 224. Furthermore, the first feature vector 224 is further convolved to generate a second feature vector 226. Each feature of the second feature vector 226 may include a number that corresponds to a possible feature of the image 201, such as "sign," "60," and "100." A softmax function (not shown) may convert the numbers in the second feature vector 226 to a probability. As such, an output 222 of the DCN 200 is a probability of the image 201 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 201 (e.g., "sign" and "60"). The weights of the DCN 200 may then be adjusted so the output 222 of the DCN 200 is more closely aligned with the target output.

As shown in FIGS. 2A-2D, machine learning is concerned with the automatic discovery of patterns in data through the use of computer algorithms. Once discovered, these patterns may be used to perform data classification and/or value prediction. With growing experimental and simulated dataset size for materials science research, the ability of algorithms to automatically learn and improve from data becomes increasingly useful. Various types of machine learning algorithms, such as neural networks, have recently been applied to materials research. Among these machine learning algorithms, convolutional neural networks (CNNs) have been very attractive in recent years due to their great success in image recognition.

The DCN 200 shown in FIG. 2D is composed of multilayer neural networks, of which at least one layer employs a mathematical operation called "convolution" to enable the DCN 200 to extract high-level features directly from data. Compared to many other algorithms that specify artificial features based on domain knowledge, the DCN 200 involves relatively little pre-processing, as the features can be directly learned from the data, such as the image 201. This is particularly useful when the features are difficult to exactly define. Unlike their long-used basic forms, such as perceptron and fully connected neural networks, DCNs are very recently used for solving solid state problems, such as learning material property prediction, material classification, and material phase transition identification.

Another advantage of neural networks is that they are easy to utilize in transfer learning, which means that a neural network first learns from a large database with inexpensive labels (e.g., first principles calculation results), and then it is fine-tuned on a small dataset where much fewer labeled samples are available (e.g., experimental data). This technique can be used to overcome the data scarcity problem in materials research, and it is applied to property prediction of small molecules and crystalline compounds very recently as a tool for accelerated materials discovery.

The practical realization and sustainable future of emergent technologies is dependent on accelerating materials discovery using neural networks. Data-driven methods are anticipated to play an increasingly significant role in enabling this desired acceleration. While the vision of accelerating materials discovery using data-driven methods is well-founded, practical realization is throttled due to challenges in data generation, ingestion, and materials state-aware machine learning. High-throughput experiments and automated computational workflows are addressing the challenge of data generation, and capitalizing on these emerging data resources involves ingestion of data into an architecture that captures the complex provenance of experiments and simulations.

In practice, machine learning may be used to perform both materials discovery and predict properties of the materials faster than molecular simulations. Machine learning can help identify correlations between material features and target properties. Nevertheless, most material discovery and properties are determined by single task machine learning models. At a top level, a multitask model that can receive some information regarding a material, such as a formula or a material structure. In this example, the multitask model can output one or more predicted properties of the material, such as bandgap, a lattice constant, elastic properties, formation energies, and the like. Unfortunately, multitask machine learning for material discovery/properties suffers from significant difficulties during training of the multitask model, such as task interference.

Some aspects of the present disclosure provide an improvement over current machine learning technology by enforcing a mathematical structure to machine learning of multiple properties of a material using a multitask model. In particular, some aspects of the present disclosure are directed to training of a multitask model by applying physical observables and quantum mechanics theory to enforce a mathematical structure on machine learning of multiple properties of materials. As a result, during training the model infers both the mapping of the input vectors to complex numbered state vectors and a set of complex Hermitian matrices (e.g., operators) for each observable that may or may not be input dependent. The target properties are calculated as expectation values of the respective operators of the Hermitian matrices given the state vectors, for example, as shown in FIG. 3.

Figure 3:
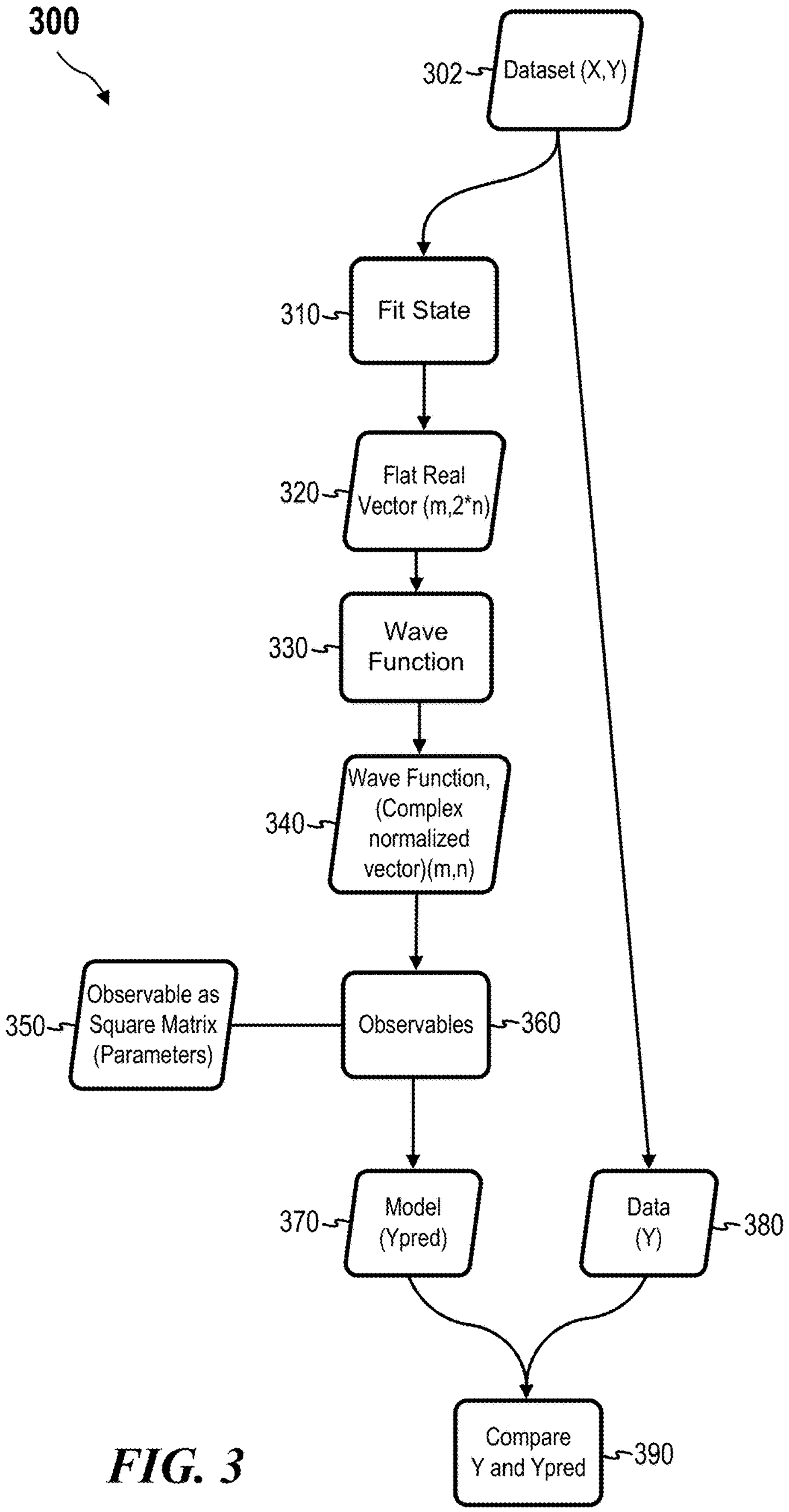
FIG. 3 is a block diagram illustrating an overview of a multitask learning process framework based on Hermitian operators, according to aspects of the present disclosure.

FIG. 3 is a block diagram illustrating an overview of a multitask learning process framework based on Hermitian operators according to aspects of the present disclosure. In some aspects of the present disclosure, a formula or structure (e.g., X) of a material is provided as input and one or more target properties (e.g., Y) of the material such as bandgap, lattice constant, elastic modulus, among others, are provided as output. In this example, these dataset values (e.g., X, Y) are shown in an input block 302. At a fit state block 310, the formula/structure of the material X is fit to a state model. In this example, the capital Y denotes a multitask machine learning scenario.

In some aspects of the present disclosure, a multitask model is trained using the physical observables, and quantum mechanics theory is applied to enforce a mathematical structure to machine learning of the multiple properties Y of the materials X. As shown in FIG. 3, the fit state block 310 provides a transformation of the formula/structure of the material X into a desired representation. For example, the transformation may be a simple matrix multiplication or other like transformation of the formula/structure of the material X into the desired representation. In aspects of the present disclosure, parameters for the conversion of the formula/structure of the material X used by the state model of the fit state block 310 are learned.

As further illustrated in FIG. 3, the desired representation of the formula/structure of the material X is provided to the flat real vector block 320. In this example, the flat real vector block 320 formats the representation of the formula/structure of the material X into a vector of m data rows and 2*n columns, in which n represents a number of column components of a complex wave function of block 330, which may be represented as a 10-bit value, including 5-bits of real numbers and 5-bits of imaginary numbers. That is, the flat real vector block 320 divides the learned parameters of the state model of the fit state block 310 into the m data rows and 2n columns, which are interpreted as a complex wave function in block 330.

At block 340, the complex wave function of block 330 is normalized to form a complex, normalized wave function vector, having m-data rows and n-column components of complex wave functions. At block 350, during training of the MTML model, input vectors are mapped onto complex number state vectors at block 340, which may or may not be dependent on the input vectors. In addition, complex Hermitian matrices (operators) are converted from observable property square matrices interred at block 350 for each of the observables 360 of the material. Also, predicted properties (e.g., Ypred) for a material are calculated as expectation values of the respective Hermitian operators and as a function of the complex number state vectors at block 370. At block 390, a loss function is performed between the target properties Y of block 380 and the predicted properties Ypred of block 370. In one example of the MTML model, a formula or structure of a material is provided as input and one or more predicted properties of the material such as bandgap, lattice constant, elastic modulus, among others, are provided as output.

Figure 4:
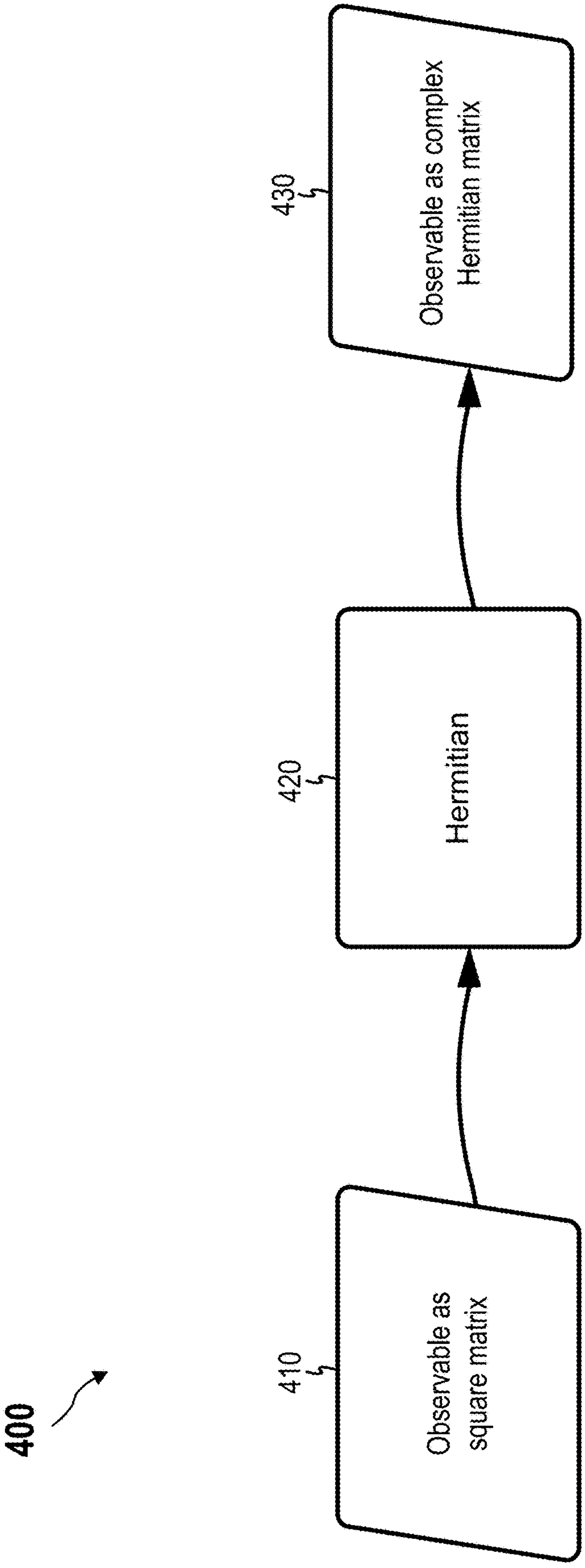
FIG. 4 is a block diagram further illustrating conversion of an observable property square matrix to a complex Hermitian operator to enable multitask learning, according to aspects of the present disclosure.

FIG. 4 is a block diagram further illustrating conversion of an observable property square matrix to a complex Hermitian operator to enable multitask learning, according to aspects of the present disclosure. The matrix conversion process of FIG. 4 may be performed in blocks 350, 360, and 370 of the multitask learning process framework 300 as shown in FIG. 3, according to aspects of the present disclosure. As shown in the multitask learning process framework 300 of FIG. 3, during training of the MTML model, complex Hermitian matrices (operators) are inferred at block 350 for each of the observables 360 of a material. This process may be performed as shown in FIG. 4, beginning with the observable property (OP) square matrix of block 410. At block 420, the OP square matrix of block 410 is converted to a complex Hermitian operator to provide the observable properties as a complex Hermitian matrix of block 430 to enable Equation (1) and Equation (2), as follows:

$$E[obs]=<psi|OP|psi> \quad (1)$$

$$<psi|OP|psi>=psi^*.Mop.PSI \quad (2)$$

where E is the expected value, OP is the observable parameter, PSI is a complex wave function state vector, and Mop refers to an observable parameters matrix, such as the complex Hermitian matrix of block 430.

According to Equation (1), the expectation value E of the observable (e.g., E[obs] may refer to Hermitian operators determined from expectation values and matrix products. According to Equation (2) of a first matrix, multiplication is performed between the observable parameters matrix Mop and the complex wave function state vector PSI (e.g., block 340) to form a matrix product. Next a complex conjugate operation is performed between the complex wave function state vector PSI and the matrix product to form the expected value of the observable parameters to predict a property (e.g., Ypred). As shown FIG. 3, predicted properties (e.g., Ypred) for a material are calculated as expectation values of the respective Hermitian operators and as a function of the complex number state vectors at block 370. At block 390, the loss function compares the target properties Y of block 390 and the predicted target properties Ypred. In this example of the MTML model, the formula or structure of the material is provided as input and predicted properties of the material such as bandgap, lattice constant, elastic modulus, among others, are provided as output.

Figure 5:
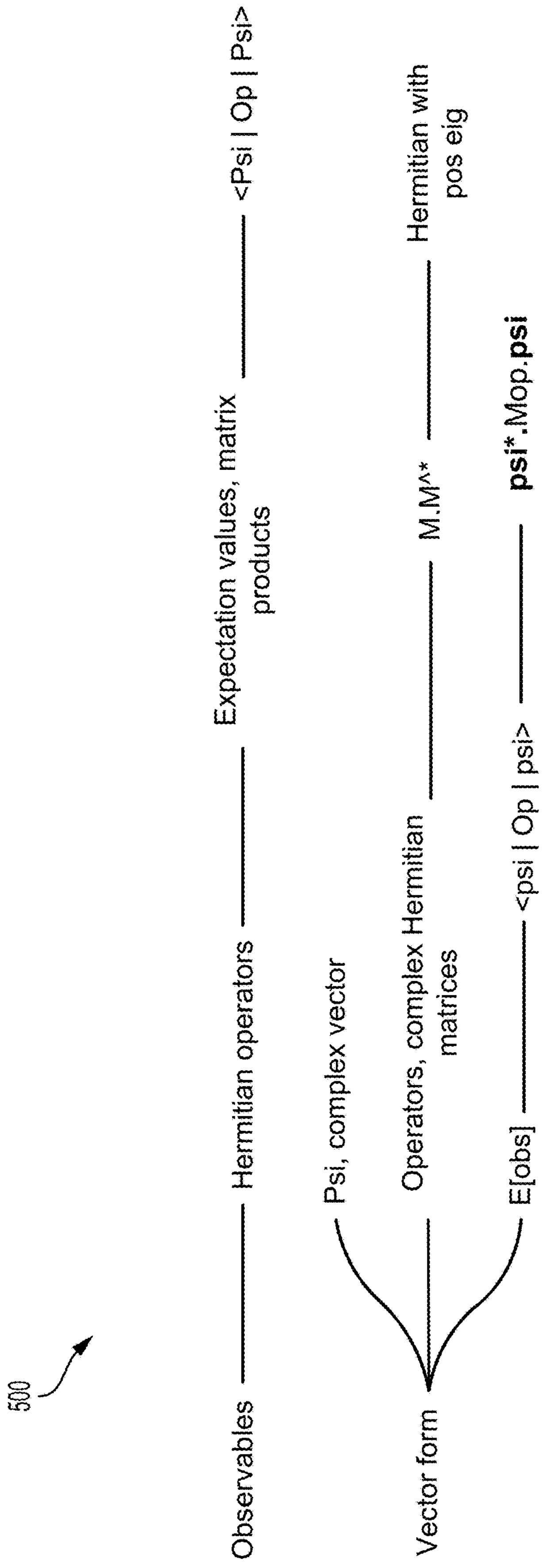
FIG. 5 is a block diagram illustrating a multitask learning process overview based on Hermitian operators, according to aspects of the present disclosure.

FIG. 5 is a block diagram illustrating a multitask learning process overview based on Hermitian operators, according to aspects of the present disclosure. The multitask learning process overview 500 provides an overview of the multitask learning process framework 300 of FIG. 3, according to aspects of the present disclosure. The multitask learning process overview 500 illustrates an improvement over current machine learning technology by enforcing a mathematical structure to machine learning of multiple properties of a material using a multitask model. As shown in FIG. 5, observable material properties are predicted as expectation values based on the matrix products performed in Equation (1).

In the multitask learning process overview 500, a vector form is used to represent complex wave functions (PSI) as complex vectors. In addition, the vector form is computed with complex Hermitian matrices as operators. These can optionally be constrained to have non-negative eigenvalues by computing them as M.M^*) to compute Hermitian matrices with positive Eigen values. In particular, this vector form enables training of a multitask model by applying physical observables and quantum mechanics theory to enforce a mathematical structure on machine learning of multiple properties of materials. As a result, during training the model infers both the mapping of the input vectors to complex numbered state vectors and a set of complex Hermitian matrices (e.g., operators) for each observable that may or may not be input dependent. The target properties are calculated as expectation values of the respective operators of the Hermitian matrices given the state vectors, according to Equations (1) and (2). This process is further illustrated, for example, according to a method as shown in FIG. 6.

Figure 6:
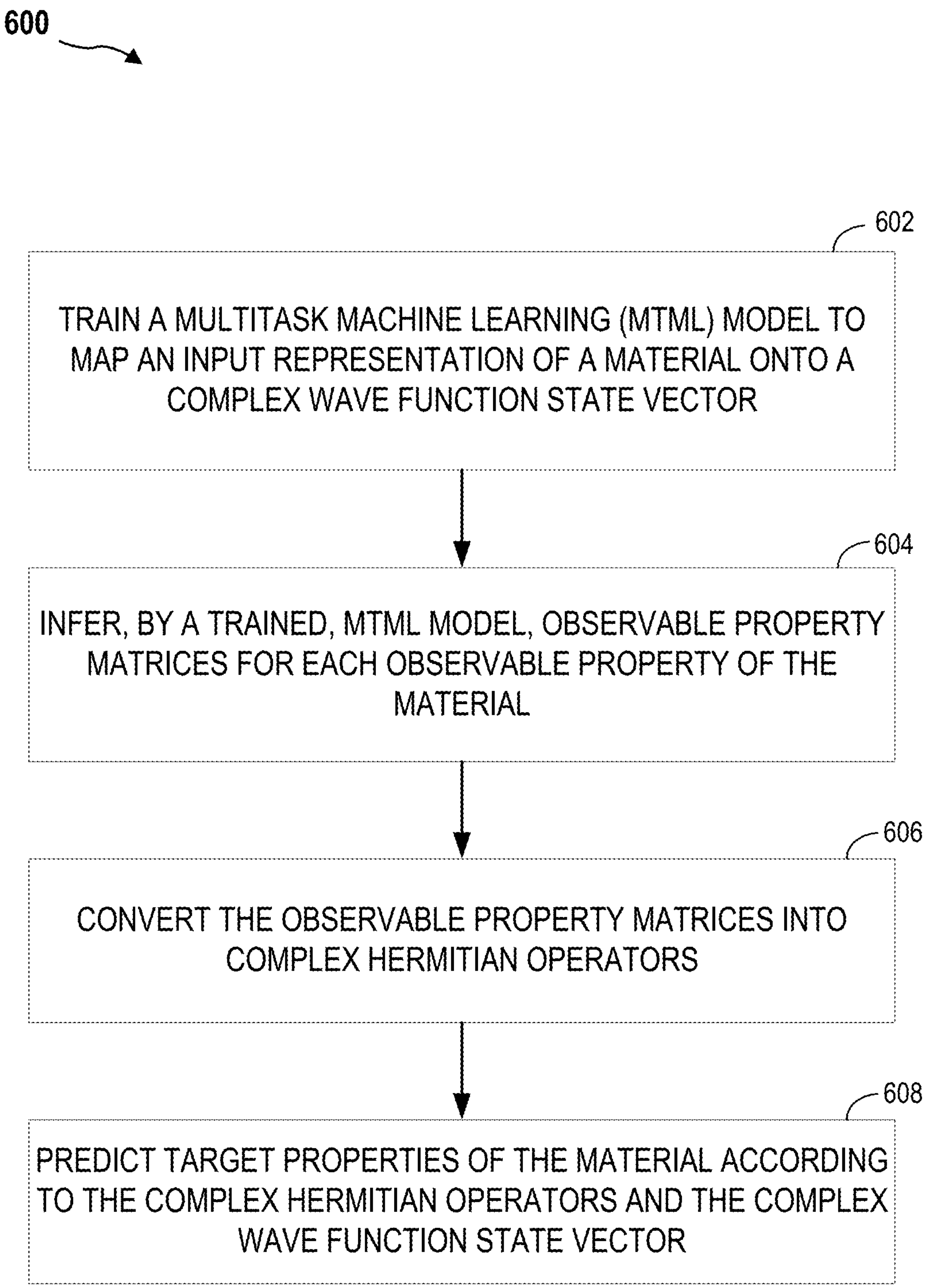
FIG. 6 is a flow diagram illustrating a method for multitask learning based on Hermitian operators, according to aspects of the present disclosure.

FIG. 6 is a flow diagram illustrating a method for multitask learning based on Hermitian operators, according to aspects of the present disclosure. A method 600 begins at block 602, in which a multitask machine learning (MTML) model is trained to map an input representation of a material onto a complex wave function state vector. For example, FIG. 3 shows the desired representation of the formula/structure of the material X from the fit state block 310, as provided to the flat real vector block 320. In this example, the flat real vector block 320 formats the representation of the formula/structure of the material X into a vector of m data rows and 2*n columns, in which n represents a number of column components of a complex wave function of block 330, which may be represented as a 10-bit value, including 5-bits of real numbers and 5-bits of imaginary numbers. That is, the flat real vector block 320 divides the learned parameters of the state model of the fit state block 310 into the m data rows and 2*n columns, which are interpreted as a complex wave function in block 330.

At block 604, observable property matrices are inferred for each observable property of the material inferred using a trained, MTML model. For example, as shown in the multitask learning process framework 300 of FIG. 3, during training of the MTML model, complex Hermitian matrices (operators) are inferred at block 350 for each of the observables 360 of a material. This process may be performed as shown in FIG. 4, beginning with the observable property (OP) square matrix of block 410. At block 420, the OP square matrix of block 410, which is inferred at block 350 of FIG. 3, is converted to a complex Hermitian operator to provide the observable properties as a complex Hermitian matrix of block 430 to enable Equation (1) and Equation (2).

At block 606, the observable property matrices are converted into complex Hermitian operators. For example, as shown in FIG. 4, at block 420, the OP square matrix of block 410, which is inferred at block 350 of FIG. 3, is converted to a complex Hermitian operator to provide the observable properties as a complex Hermitian matrix of block 430 to enable Equation (1) and Equation (2), as shown above. As shown in FIG. 3, complex Hermitian matrices (operators) are converted from observable property square matrices inferred at block 350 for each of the observables 360 of the material.

At block 608, target properties of the material are predicted according to the complex Hermitian operators and the complex wave function state vector. For example, as shown in FIG. 3, predicted properties (e.g., Ypred) for a material are calculated as expectation values of the respective Hermitian operators and as a function of the complex number state vectors at block 370. At block 390, a loss function is performed between the target properties Y of block 380 and the predicted properties Ypred of block 370. In one example of the MTML model, a formula or structure of a material is provided as input and one or more predicted properties of the material such as bandgap, lattice constant, elastic modulus, among others, are provided as output.

The method of 600 may include predicting target properties by calculating a product of the complex Hermitian operators and the complex wave function state vector. The method of 600 may also include predicting target properties of the material as expectation values of a complex conjugate operation between the calculated product and the complex wave function state vector. The method 600 may further include predicting the target properties by performing a loss function between the predicted target properties (Ypred) and the observable target properties (Y) of the material. The method may also include training by learning parameters of the multitask model for mapping an input formula/structure of the material to the complex wave function state vector. The method 600 may further include dividing the learned parameters into rows and columns according to a predetermined format. The method 600 may also include normalizing the predetermined format of the learned parameters to form the complex wave function state vector.

The method 600 may include training by applying physical observables and quantum mechanics theory to enforce a mathematical structure on machine learning of multiple properties of materials. The observable property matrices comprise square matrices. The method 600 may further include predicting the observable properties of target properties of the material, including a bandgap, a lattice constant, an elastic property, and/or a formation energy. The method 600 may also include predicting the target properties by calculating expectation values of respective operators of Hermitian matrices given the complex wave function state vector, for example, as shown in FIGS. 3-5.

In some aspects, the method 600 may be performed by the SoC 100 (FIG. 1). That is, each of the elements of the method 600 may, for example, but without limitation, be performed by the SoC 100 or one or more processors (e.g., CPU 102 and/or NPU 108) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a non-transitory computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for multitask learning based on Hermitian operators, comprising:

training a multitask machine learning (MTML) deep convolutional neural network (DCN) model to map an input formula/structure of a material onto a complex wave function state vector (PSI);

enforcing a mathematical structure to machine learning of multiple properties of the material during the training to provide a trained MTML DCN model;

inferring, by the trained, MTML DCN model, observable property matrices (OP) for each observable property (obs) of the material;

converting the observable property matrices OP into complex Hermitian operators for each observable property obs of the material as an expectation value (E) of each of the obs (E[obs]);

predicting, by the trained MTML DCN model, target properties of the material, comprising a bandgap, a lattice constant, an elastic property, and/or a formation energy, according to the expectation value E of each observable property of the material E[obs], an observable parameters matrix (Mop), and the complex wave function state vector (PSI) by E[obs]=psi*.Mop.PSI as predicted target properties;

performing a loss function to reduce a difference between the predicted target properties (Ypred) and the target properties (Y) of the material to a threshold value; and identifying the material as a new material discovery when a unique combination of the predicted target properties (Ypred) is observed in the material according to the performing of the loss function.

2. The method of claim 1, in which training comprises:

learning parameters of the multitask model for mapping the input formula/structure of the material to the complex wave function state vector;

dividing the learned parameters into rows and columns according to a predetermined format; and normalizing the predetermined format of the learned parameters to form the complex wave function state vector.

3. The method of claim 1, in which enforcing further comprises applying physical observables and quantum mechanics theory to enforce the mathematical structure on machine learning of multiple properties of materials.

4. The method of claim 1, in which the observable property matrices comprise square matrices.

5. A non-transitory computer-readable medium having program code recorded thereon for multitask learning based on Hermitian operators, the program code being executed by a processor and comprising:

program code to train a multitask machine learning (MTML) deep convolutional neural network (DCN) model to map an input formula/structure of a material onto a complex wave function state vector;

program code to enforce a mathematical structure to machine learning of multiple properties of the material during the training to provide a trained MTML DCN model;

program code to infer, by the trained, MTML DCN model, observable property matrices (OP) for each observable property of the material;

program code to convert the observable property matrices into complex Hermitian operators for each observable property obs of the material as an expectation value (E) of each of the obs (E[obs]);

program code to predict, by the trained MTML DCN model, target properties of the material, comprising a bandgap, a lattice constant, an elastic property, and/or a formation energy, according to the expectation value E of each observable property of the material E[obs], an observable parameters matrix (Mop), and the complex wave function state vector (PSI) by E[obs] =psi*.Mop.PSI as predicted target properties;

program code to perform a loss function to reduce a difference between the predicted target properties (Ypred) and the target properties (Y) of the material to a threshold value; and program code to identify the material as a new material discovery when a unique combination of the predicted target properties is observed in the material according to the program code to perform the loss function.

6. The non-transitory computer-readable medium of claim 5, in which the program code to train comprises:

program code to learn parameters of the multitask model for mapping the input formula/structure of the material to the complex wave function state vector;

program code to divide the learned parameters into rows and columns according to a predetermined format; and program code to normalize the predetermined format of the learned parameters to form the complex wave function state vector.

7. The non-transitory computer-readable medium of claim 5, in which the program code to enforce further comprises program code to apply physical observables and quantum mechanics theory to enforce a mathematical structure on machine learning of multiple properties of materials.

8. The non-transitory computer-readable medium of claim 5, in which the observable property matrices comprise square matrices.

9. A system for multitask learning based on Hermitian operators, the system comprising:

a multitask machine learning (MTML) deep convolutional neural network (DCN) model, trained to map an input formula/structure of a material onto a complex wave function state vector, to enforce a mathematical structure to machine learning of multiple properties of the material during the training to provide a trained MTML DCN model, the trained, MTML DCN model to infer observable property matrices for each observable property (obs) of the material, to convert the observable property matrices OP into complex Hermitian operators for each observable property obs of the material as an expectation value (E) of each of the obs (E[obs]), to predict, by the trained MTML DCN model, target properties of the material, comprising a bandgap, a lattice constant, an elastic property, and/or a formation energy, according to the expectation value E of each observable property of the material E[obs], an observable parameters matrix (Mop), and the complex wave function state vector (PSI) by E[obs] =psi*.Mop.PSI as predicted target properties, to perform a loss function to reduce a difference between the predicted target properties (Ypred) and the target properties (Y) of the material to a threshold value, and to identify the material as a new material discovery when a unique combination of the predicted target properties is observed in the material according to the performance of the loss function.

10. The system of claim 9, in which the observable property matrices comprise square matrices.

* * * * *